US012665780B2

(12) United States Patent
Kien et al.

(10) Patent No.: US 12,665,780 B2
(45) Date of Patent: Jun. 23, 2026

(54) CATV HYBRID FIBER-COAXIAL NETWORK HEADEND VIRTUAL GATEWAY

(71) Applicant: Applied Optoelectronics, Inc., Sugar Land, TX (US)

(72) Inventors: Bao Kien, Sugar Land, TX (US); Mark Siejka, Winder, GA (US); Rafael Celedon, Atlanta, GA (US); Ramesh Nallur, Duluth, GA (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 120 days.

(21) Appl. No.: 18/887,438

(22) Filed: Sep. 17, 2024

(65) Prior Publication Data

US 2025/0125987 A1 Apr. 17, 2025

Related U.S. Application Data

(60) Provisional application No. 63/544,275, filed on Oct. 16, 2023.

(51) Int. Cl.
*H04L 12/28* (2006.01)

(52) U.S. Cl.
CPC ................................ *H04L 12/2801* (2013.01)

(58) Field of Classification Search
CPC .. H04L 12/2801; H04N 21/6118; H04N 7/10; H04N 7/22; H04B 10/297; H04Q 11/0062
See application file for complete search history.

(56) References Cited

U.S. PATENT DOCUMENTS

| | | | |
|---|---|---|---|
| 9,647,718 B2 | 5/2017 | Seller | |
| 2004/0022304 A1 | 2/2004 | Santhoff et al. | |
| 2009/0248828 A1* | 10/2009 | Gould | G08B 27/005 |
| | | | 705/1.1 |
| 2009/0271836 A1 | 10/2009 | Maxson et al. | |
| 2010/0316372 A1 | 12/2010 | Chang et al. | |
| 2013/0279914 A1 | 10/2013 | Brooks | |
| 2015/0172072 A1 | 6/2015 | Rakib | |
| 2016/0134447 A1 | 5/2016 | Rumpunen et al. | |
| 2016/0269724 A1 | 9/2016 | Bronkhorst | |
| 2016/0295251 A1* | 10/2016 | Cloonan | H04N 21/615 |

(Continued)

FOREIGN PATENT DOCUMENTS

AU        2020102711 A4    12/2020

OTHER PUBLICATIONS

US Office Action issued Aug. 19, 2025 in U.S. Appl. No. 18/437,594, 31 pgs.

(Continued)

*Primary Examiner* — Sung S Ahn
(74) *Attorney, Agent, or Firm* — Secant IP PLLC

(57) ABSTRACT

The present disclosure provides a computer-implemented method for communication with radio frequency (RF) amplifiers in a hybrid fiber-coaxial (HFC) network, the computer-implemented method including: providing, by one or more computer processors, return communications from one or more RF amplifiers to a headend; and providing, by the one or more computer processors, forward communications from the headend to the one or more RF amplifiers, wherein: the return communications and the forward communications use out of band (OOB) communication protocols.

20 Claims, 16 Drawing Sheets

(56) References Cited

U.S. PATENT DOCUMENTS

| 2018/0248983 | A1 | 8/2018 | Mohebbi et al. |
| 2019/0356532 | A1 | 11/2019 | Hamzeh et al. |
| 2021/0143865 | A1 | 5/2021 | Ariesen et al. |
| 2021/0360884 | A1 | 11/2021 | Woytowitz |
| 2024/0214008 | A1 | 6/2024 | Williams et al. |
| 2024/0214820 | A1 | 6/2024 | Yeung et al. |

OTHER PUBLICATIONS

"LLCC68, Long Range, Low Power, sub-GHz RF Transceiver", Jul. 2019, pp. 1-106, Semtech Corporation, Wireless & Sensing Products, Camarillo, California.

"SX1261/2, Long Range, Lower Power, sub-GHz RF Transceiver", Dec. 2021, pp. 1-114, Semtech Corporation, Wireless & Sensing Products, Camarillo, California.

"SX1302, LoRa Gateway Baseband Processor", Oct. 2020, pp. 1-31, Semtech Corporation, Wireless & Sensing Products, Camarillo, California.

"DBx smart RF amplifiers—DBE-1200S smart RF amplifier triple active output", Dec. 2021, EN/V11, Technetix Group Limited, technetix.com, pp. 1-4.

"ICON3100, Intelligent 1.8 GHz Amplifier", 2021, Teleste Corporation, www.teleste.com, pp. 1-2.

"ICON4300, Intelligent 1.8 GHz Amplifier", 2021, Teleste Corporation, www.teleste.com, pp. 1-2.

* cited by examiner

800

810

From Control packets:
LoRa packet info

Implicit or Explicit
Mode?

Yes
(implicit mode)

812

CRCOn: Header + Payload
Payload length: fixed

No
(explicit mode)

814

The explicit packet
includes a short header
that contains information
about the number of
bytes, coding rate and
whether a CRC is used
in the packet

| Implicit Header | Transmitter | Receiver | CRC Status |
|---|---|---|---|
| Value of the bit RxPayloadCrcOn | 0 | 0 | CRC is not checked |
| | 0 | 1 | CRC is always wrong |
| | 1 | 0 | CRC is not checked |
| | 1 | 1 | CRC is checked |

FIG. 8C

| Explicit Header | Transmitter | Receiver | CRC Status |
|---|---|---|---|
| Value of the bit RxPayloadCrcOn | 0 | 0 | CRC is not checked |
| | 0 | 1 | CRC is not checked |
| | 1 | 0 | CRC is checked |
| | 1 | 1 | CRC is checked |

FIG. 8D

CATV HYBRID FIBER-COAXIAL NETWORK HEADEND VIRTUAL GATEWAY

CROSS-REFERENCE TO RELATED APPLICATIONS

The present application claims the benefit of the filing date of U.S. Provisional Application Ser. No. 63/544,275, filed Oct. 16, 2023, the entire teachings of which application is hereby incorporated herein by reference.

TECHNICAL FIELD

The present application relates generally to hybrid fiber and cable systems and, more particularly, to a CATV hybrid fiber-coaxial network headend virtual gateway.

BACKGROUND

Broadband communication networks are used to provide high speed, high bandwidth transmissions over communication paths to and from devices in the network. In some broadband networks, such as hybrid fiber-coaxial (HFC) networks used for CATV, at least a portion of the communication path includes coaxial cables that carry both downstream and upstream radio frequency (RF) signals. In a CATV network, for example, the downstream RF signals may include video and IP data transmitted from a headend of the HFC network to subscriber devices and the upstream RF signals may include control and IP data transmitted from subscriber devices to the headend. In such broadband networks, there is often a desire to transmit additional information, such as control or status data, to and from devices in the network, for example, to have a more resilient and reliable broadband network and to be able to perform preemptive strategic maintenance to avoid outages. However, providing additional bi-directional transmissions over the coaxial cables and other physical communication media without interfering with the existing downstream and upstream RF signals presents challenges.

In an HFC network, for example, the coaxial distribution network may include RF amplifiers to extend the transmission distance of the RF signals and thus extend the reach of the CATV services provided to subscriber locations. Providing bi-directional communication with the RF amplifiers is desirable for purposes of remotely controlling and/or monitoring the RF amplifiers. According to one solution, a Data over Cable Service Interface Specification or DOCSIS cable modem transponder may be included in the RF amplifier to provide control of and communication with the RF amplifier; however, DOCSIS transponders tend to consume significant power and generate significant heat. As the bandwidth of broadband networks increases (e.g., 1.8 GHZ), managing the power consumption and heat generated in the network devices has been a bigger challenge. In an RF amplifier in a CATV network, in particular, amplification of the CATV RF signals may consume significant power while generating excessive heat, particularly with the expanding bandwidth of CATV networks. Including additional components in the RF amplifier may create additional challenges with respect to reducing power consumption and limiting energy dissipation and heat.

To overcome the power consumption and heat generation of the DOCSIS cable modem transponder, low data rate, low power, bi-directional transmissions may be implemented in the RF amplifiers. As the cable distribution system moves to newer technology, such as DOCSIS 4.0, a distributed architecture, with many functions moved into software rather than hardware.

Accordingly, there is a need for a relatively low power system and method for providing bi-directional communication over existing coaxial cables in a broadband network without substantially interfering with the existing downstream and upstream RF signals, implemented in software for use in distributed architecture HFC networks.

BRIEF DESCRIPTION OF THE DRAWINGS

Reference should be made to the following detailed description which should be read in conjunction with the following figures, wherein like numerals represent like parts.

FIG. 8C is a table of example header values for an implicit header for the DEPI framing consistent with the present disclosure.

FIG. 8D is a table of example header values for an explicit header for the DEPI framing consistent with the present disclosure.

DETAILED DESCRIPTION

Figure 1:
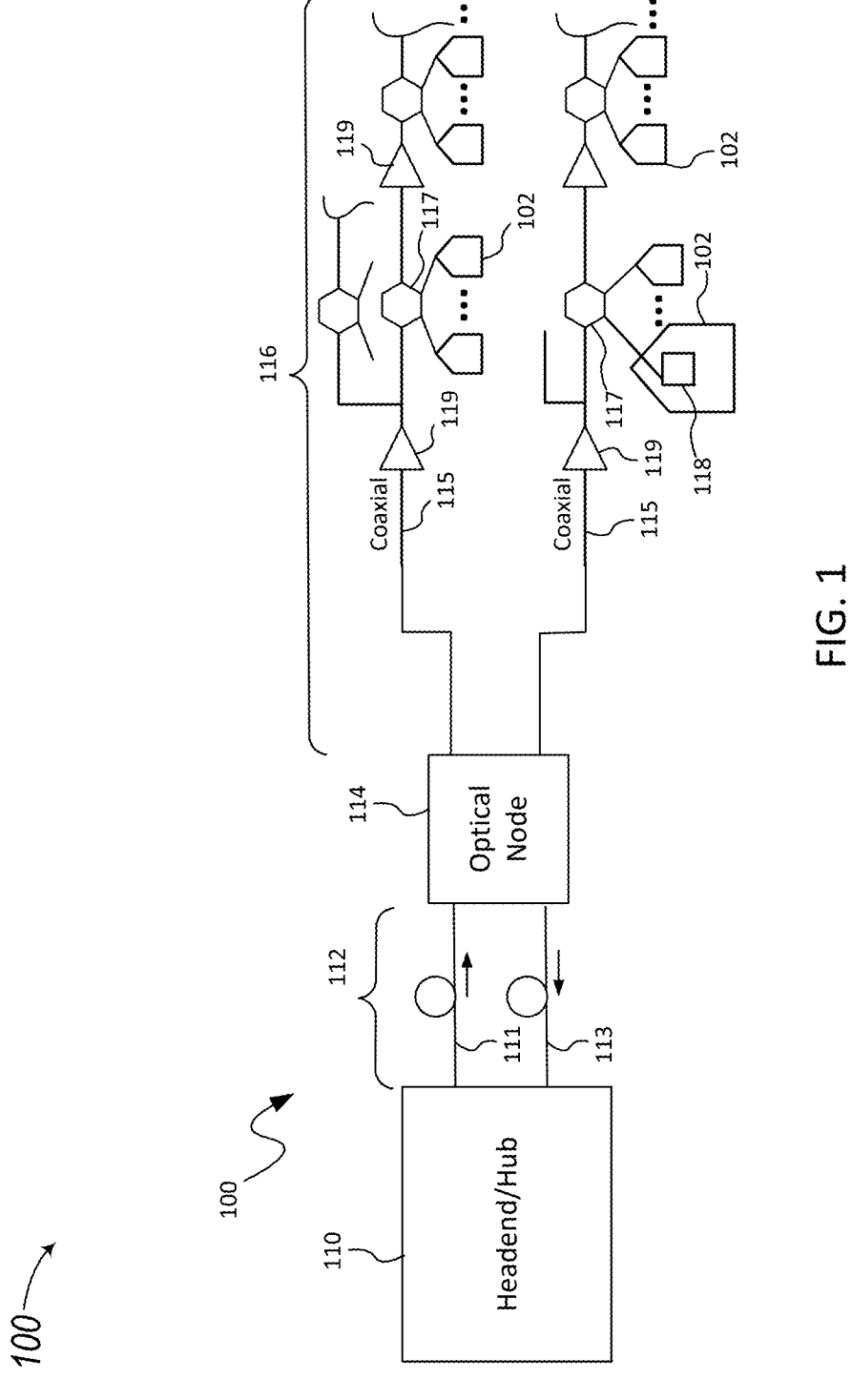
FIG. 1 is a schematic diagram of a hybrid fiber-coaxial (HFC) network used for CATV consistent with the present disclosure.

The present disclosure is not limited in its application to the details of construction and the arrangement of components set forth in the following description or illustrated in the drawings. The examples described herein may be capable of other embodiments and of being practiced or being carried out in various ways. Also, it may be appreciated that the phraseology and terminology used herein is for the purpose of description and should not be regarded as limiting as such may be understood by one of skill in the art. Throughout the present description, like reference characters may indicate like structure throughout the several views, and such structure need not be separately discussed. Furthermore, any particular feature(s) of a particular exemplary embodiment may be equally applied to any other exemplary embodiment(s) of this disclosure as suitable. In other words, features between the various exemplary embodiments described herein are interchangeable, and not exclusive.

FIG. 1 illustrates an example of a hybrid fiber-coaxial (HFC) network 100 used for CATV, which may implement systems and methods for low data rate, low power, bi-directional transmissions implemented in software, consistent with embodiments of the present disclosure. The systems and methods for low data rate, low power, bi-directional transmissions may be implemented, for example, to communicate with an optical node 114 and/or line extender RF amplifiers 119 in the HFC network 100, as described in greater detail below. In general, the HFC network 100 is capable of delivering both cable television programming (i.e., video) and IP data services (e.g., internet and voice over IP) to customers or subscribers 102 through the same fiber optic cables and coaxial cables (i.e., trunk lines). Such a HFC network 100 is commonly used by service providers, such as Comcast Corporation, to provide combined video, voice, and broadband internet services to the subscribers 102. Although example embodiments of HFC networks are described herein based on various standards (e.g., DOCSIS), the concepts described herein may be applicable to other embodiments of CATV networks using other standards.

Multiple cable television channels and IP data services (e.g., broadband internet and voice over IP) may be delivered together simultaneously in the HFC network 100 by transmitting signals using frequency division multiplexing over a plurality of physical channels across a CATV channel spectrum. In a CATV channel spectrum, some of the physical channels may be allocated for cable television channels and other physical channels may be allocated for IP data services. Other channel spectrums and bandwidths may also be used and are within the scope of the present disclosure.

In addition to the primary signals being carried downstream (also referred to as forward signals) to deliver the video and IP data to the subscribers 102, the HFC network 100 may also carry primary signals (e.g., IP data or control signals) upstream from the subscribers (also referred to as reverse signals), thereby providing bi-directional communication over the trunks. According to one example, the signal spectrum for the reverse signals carried upstream may be up to 600 MHz.

The HFC network 100 generally includes a headend/hub 110 connected via optical fiber trunk lines 112 to one or more optical nodes 114, which are connected via a coaxial cable distribution network 116 to customer premises equipment (CPE) 118 at subscriber locations 102. The headend/hub 110 receives, processes, and combines the content (e.g., broadcast video, narrowcast video, and internet data) to be carried over the optical fiber trunk lines 112 as optical signals. The optical fiber trunk lines 112 include forward path optical fibers 111 for carrying downstream optical signals from the headend/hub 110 and return or reverse path optical fibers 113 for carrying upstream optical signals to the headend/hub 110. The optical nodes 114 provide an optical-to-electrical interface between the optical fiber trunk lines 112 and the coaxial cable distribution network 116. The optical nodes 114 thus receive downstream optical signals and transmit upstream optical signals and transmit downstream (forward) RF electrical signals and receive upstream (reverse) RF electrical signals.

The coaxial cable distribution network 116 includes coaxial cables 115 including trunk coaxial cables connected to the optical nodes 114 and feeder coaxial cables connected to the trunk coaxial cables. Subscriber drop coaxial cables are connected to the distribution coaxial cables using taps 117 and are connected to customer premises equipment 118 at the subscriber locations 102. The customer premises equipment 118 may include set-top boxes for video and cable modems for data. One or more line extender RF amplifiers 119 may also be coupled to the coaxial cables 115 for amplifying the forward signals (e.g., CATV signals) being carried downstream to the subscribers 102 and for amplifying the reverse signals being carried upstream from the subscribers 102. In this embodiment, the optical node 114 and/or the line extender RF amplifiers 119 may include transponders and the headend/hub 110 may include a gateway device to implement the low data rate, low power, bi-directional transmissions together with the downstream and upstream primary signals, which have a higher bandwidth and power.

Figure 2:
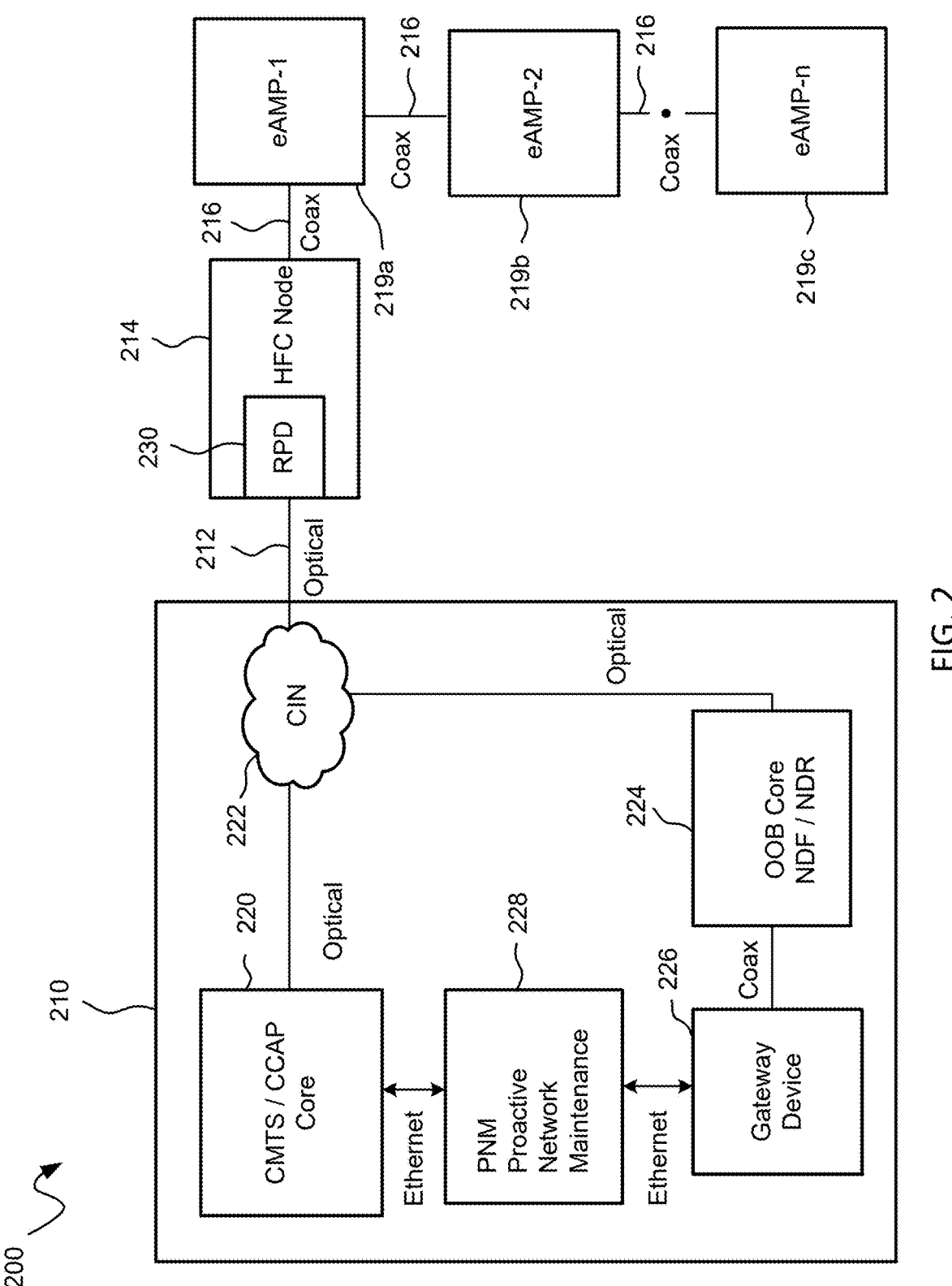
FIG. 2 is a schematic diagram of a remote PHY (R-PHY) HFC network configured for low data rate, low power, bi-directional transmissions between network devices and a headend consistent with the present disclosure.

FIG. 2 shows an implementation of a system for low data rate, low power, bi-directional transmissions in a remote PHY type HFC network 200. This HFC network 200 also includes a headend 210 coupled to an HFC node 214 using optical fiber 212 and includes RF amplifiers 219*a-c* coupled to the HFC node 214 using coaxial cables 216, similar to the HFC network 100 described above and shown in FIG. 1. In this embodiment of the HFC network 200, low data rate, low power, bi-directional transmissions may be implemented in the RF amplifiers 219*a-c*, for example, to communicate with a proactive network maintenance (PNM) system in the headend. In this HFC network 200, digital communication is provided over the optical fiber 212 between the headend 210 and the HFC node 214 and the HFC node 214 includes a remote PHY device (RPD) 230 to handle the digital communications.

In this embodiment of the HFC network 200, the headend 210 includes an integrated CMTS or Converged Cable Access Platform (CCAP) core 220 coupled to a converged interconnected network (CIN) 222. The CCAP core 220 and the CIN 222 provide digitized optical communication with the RPD 230 in the HFC node 214. The headend 210 also includes a gateway device 226 to establish the low data rate, low power bi-directional transmissions. In this embodiment, the analog low data rate, low power bi-directional transmissions are digitized for communication between the CIN 222 and the RPD 230 in the HFC node 214. The RPD 230 converts upstream signals from analog to digital and converts downstream signals from digital to analog, and the headend 210 may include an out-of-band (OOB) core 224 coupled to the gateway device 226 to handle the A/D and D/A conversion in the headend 210 for the low data rate, low power bi-directional transmissions.

The OOB core 224 may use known technologies and standards in the DOCSIS R-PHY specifications referred to as the OOB (out-of-band) communication protocols, which are further defined in the remote out-of-band (CM-SP-R-OOB) specification. As defined in the CM-SP-R-OOB specification, Narrowband Digital Forward (NDF) and Narrowband Digital Return (NDR) digitizes a small portion of the spectrum and sends the digital samples as payload within packets that traverse between the CMTS/CCAP core 220 and the RPD 230. This approach works with any type of OOB signal as long as the signal can be contained within the defined pass bands.

In the embodiment of the HFC network 200 described above, the headend 210 may include a PNM system 228 coupled to the CMTS 220 and the gateway device 226. The PNM system 228 may be used by cable operators to perform strategic maintenance of a network preemptively to avoid long outages and to have a more resilient and reliable broadband network. Commands and/or data used by the PNM system 228 may be transmitted and received via the low data rate, low power bi-directional transmissions established using the gateway device 226 to provide network maintenance. The PNM system 228 may include existing PNM systems known to those skilled in the art. The headend 210 may use the gateway device 226 and the low data rate, low power bi-directional transmissions to communicate the commands and/or data for managing a large number of network devices, such as nodes and RF amplifiers, in the HFC network 200 using existing network management and control systems. The systems and methods for low data rate, low power bi-directional transmissions, consistent with embodiments of the present disclosure, thus provide a relatively simple, reliable, and low cost solution for monitoring, controlling, and managing broadband networks without detectable interference with the primary broadband signals.

Figure 3:
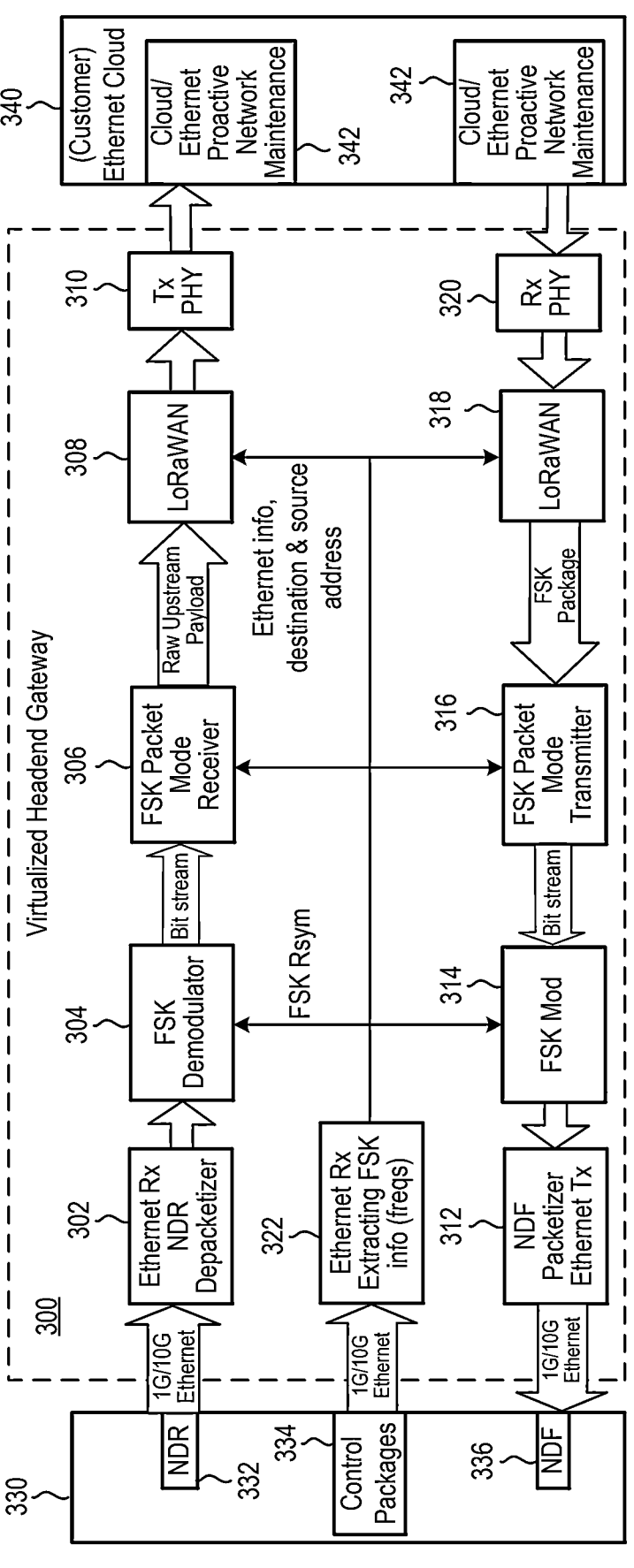
FIG. 3 is a functional block diagram of an illustrative example of a software headend virtual gateway consistent with the present disclosure.

FIG. 3 is a functional block diagram of an illustrative example of a headend software virtual gateway 300 consistent with the present disclosure. The software virtual gateway 300 replaces a hardware gateway device, e.g., the gateway device 226 from FIG. 2, with a virtual gateway implemented in software, allowing for secure, efficient, and standards-compliant communication between network components. The virtual gateway 300 provides several advantages over existing hardware devices. When implementing a distribution network using hardware gateway devices, many gateway devices may be required over the network, along with the necessary housing, including power and heat considerations for each gateway device. The virtual gateway 300 may be cloud-based, eliminating the need for a hardware gateway device for each headend in the HFC distribution system. The virtual gateway 300 also avoids issues such as requiring unique gateway device hardware for each headend model. Further, as the cable system moves to the distributed architecture of DOCSIS 4.0 and 1.8 Gbps data rates, there is no physical CMTS to connect to a hardware gateway device.

In the illustrative example of FIG. 3, the virtual gateway 300 interfaces digitally between the cloud 330 hosting the RF amplifiers that support low data rate, low power, bi-directional transmissions, such as RF amplifiers 219a-c from FIG. 2, and the PNM, such as PNM 228 from FIG. 2. The interface between the RF amplifiers and the PNM may be, for example, an Ethernet interface, which may be 1 Gbps Ethernet, 10 Gbps Ethernet, or any other Ethernet interface as would be known to one of skill in the art.

The virtual gateway 300 receives NDR data from the NDR 332 of the RF amplifiers and sends NDF data to the NDF 336 of the RF amplifiers via the cloud 330. The Ethernet Rx module 322 of the virtual gateway 300 also receives control packages 334 from the RF amplifiers via the cloud 330. The control packages 334 contain the information necessary to translates commands and data to TCP/IP commands and data for transmission. The control packages may include, but are not limited to, FSK information, such as frequencies available within the spectrum, and Ethernet information, such as destination address and source address for forward packets sent from the headend to the RF amplifiers and return packets from the RF amplifiers to the headend. This FSK and Ethernet information is sent to an FSK demodulator module 304, an FSK packet mode receiver module 306, a return LoRaWAN module 308 for control packets being sent from the RF amplifiers to the PNM in the headend. This FSK and Ethernet information is also sent to an FSK modulator module 314, an FSK packet mode transmitter module 316, and the forward LoRaWAN module 318 for control packets being sent from the PNM in the headend to the RF amplifiers. The return LoRaWAN module 308 and the forward LoRaWAN module 318 implement the LoRa communication protocols defined by either FSK or the LoRaWAN standard.

The NDR packets are first processed by the NDR depacketizer module 302. This is shown in more detail in FIG. 4. The NDR depacketizer module 302 converts the Ethernet packets to, for example, 10-bit I/Q (in-phase (I) and quadrature (Q) components) data, which may then be converted by the FSK demodulator module 304 into a bit stream, using the frequency information obtained from the control packages 334 in the RF amplifiers. An example of an FSK demodulator module 304 is shown in FIG. 5. The bit stream generated by the FSK demodulator module 304 is converted by the FSK packet mode receiver module 306 to a raw upstream payload using frequency information obtained from the control packages 334. The FSK packet mode receiver module 306 is shown in more detail in FIG. 6. The raw upstream data is then converted into payloads for the OOB transmission by the return LoRaWAN module 308. The output from the return LoRaWAN module 308 are then packaged by the Tx PHY 310 and sent as Ethernet packets to the PNM 342 via the headend cloud 340. The Ethernet packets sent to the PNM 342 by the virtual gateway 300 generally consist of commands and data for communication with the RF amplifiers for purposes of remotely controlling and/or monitoring the RF amplifiers.

In the forward direction, packets are received by the Rx PHY module 320 in the virtual gateway 300 from the PNM 342 in the headend over the headend cloud 340, are unpackaged by the Rx PHY module 320, and the result is sent to the forward LoRaWAN module 318. The forward LoRaWAN module 318 performs FSK packaging of the customer PNM payload and sends the FSK package to the FSK packet mode transmitter module 316. The FSK package is converted into a bitstream by the FSK packet mode transmitter module 316, using frequency information obtained from the control packages 334. The bitstream is then modulated into, for example, 10-bit I/Q data by the FSK modulator module 314. Finally, the modulated data is converted to Ethernet packets which may be, for example, DOCSIS External Downstream Interface (DEPI) packages, and the Ethernet packets are sent over the cloud 330 by the NDF packetizer module 312. The NDF packetizer module 312 is described in more detail in FIG.

10. The packets are received by a remote PHY, which converts the NDF payload to an RF signal which is forwarded to the RF amplifier.

Figure 4:
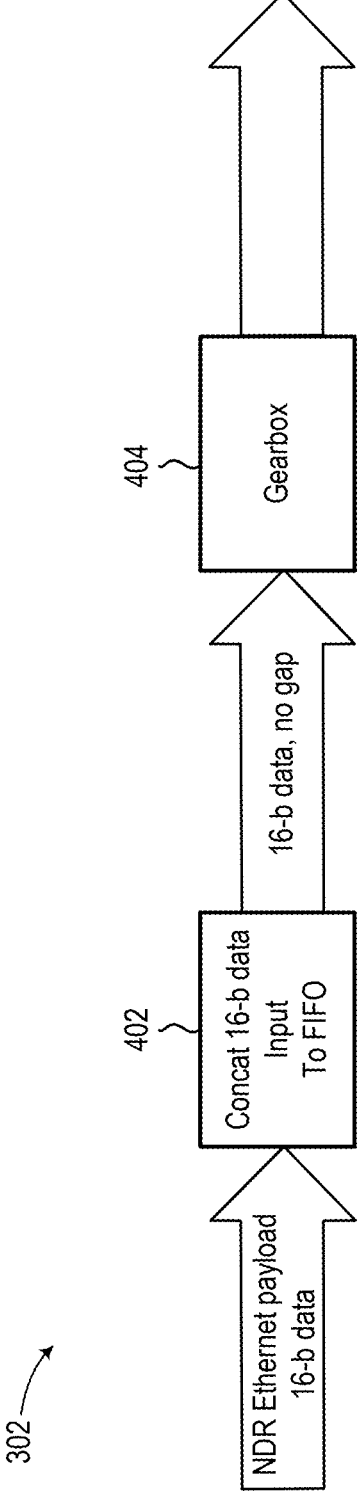
FIG. 4 is a functional block diagram illustrating a Narrowband Digital Return (NDR) depacketizer consistent with the present disclosure.
Figure 5:
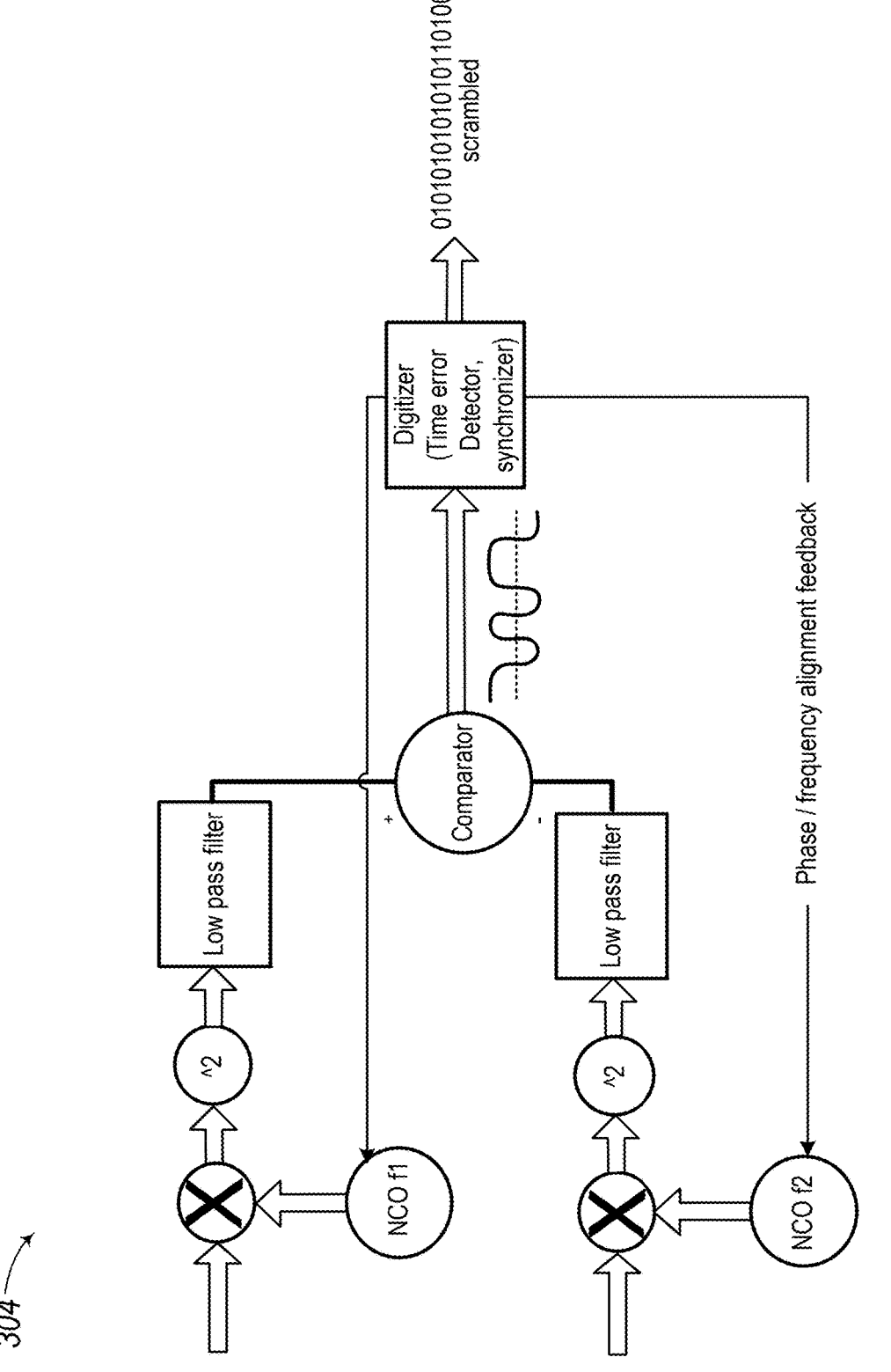
FIG. 5 is a functional block diagram illustrating a Frequency-shift keying (FSK) demodulator consistent with the present disclosure.

FIG. 4 is a functional block diagram illustrating the NDR depacketizer module 302 consistent with the present disclosure. The NDR depacketizer module 302 receives the Ethernet packets containing the NDR payload from the NDR 332. In FIFO module 402, the concatenated m-bit data from the payload is input into a FIFO. In an embodiment, the m-bit data may be 16-bit data. The m-bit data without gaps is then converted by a gearbox module 404. A gearbox translates serial data streams at one rate to a serial stream at a different rate. In an embodiment, the gearbox may convert the m-bit data to 10-bit data in I/Q format. The output from this module is the payload data. In an embodiment, the data rate may be, for example, 20 bits at 1.28 Msps (Megasamples per second).

FIG. 5 is a functional block diagram illustrating an illustrative example of the FSK demodulator module 304 consistent with the present disclosure. The FSK demodulator module 304 converts the payload data stream from the NDR depacketizer module 302 to an encoded bitstream. The FSK demodulator module 304 is just one example of an FSK demodulator. Many other FSK demodulators may be used, as would be known to a person of skill in the art.

Figure 6:
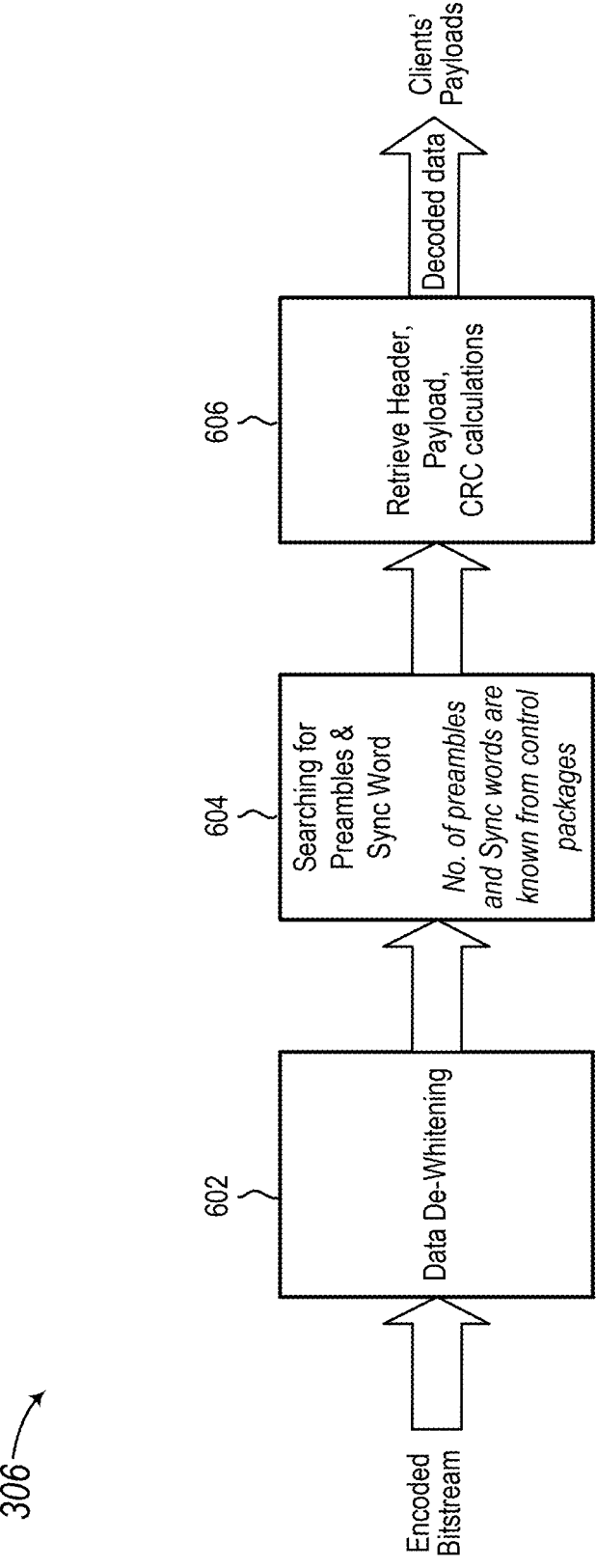
FIG. 6 is a functional block diagram illustrating a FSK packet mode receiver consistent with the present disclosure.

FIG. 6 is a functional block diagram illustrating the FSK packet mode receiver module 306 consistent with the present disclosure. The FSK packet mode receiver module 306 receives the encoded bitstream from the FSK demodulator module 304 in the data de-whitening module 602. The LoRa specification supports a data whitening block that breaks series of identical bits and introduces randomness in the stream. This helps in removing DC-bias in data because long bit runs become less likely. De-whitening removes the randomness of the data. In an embodiment, the data de-whitening module 602 uses a linear-feedback shift register (LFSR), which is a shift register whose input bit is a linear function of its previous state. In one example embodiment, the LFSR polynomial may be X9+X5+1.

The de-whitened data is then processed by the preamble and sync word search module 604. The preamble and sync word search module 604 receives the number of preambles and sync words obtained from the control packages 334 received from the RF amplifiers.

Once the number of preambles and sync words have been extracted from the de-whitened data, a header and payload module 606 retrieves the header, payload, and CRC calculations from the de-whitened data, resulting in a raw upstream payload that is sent to the return LoRaWAN module 308. The return LoRaWAN module 308 then takes the raw upstream payload and the Ethernet information obtained from the control packages 334, which may include the destination address and the source address, and combines this information into a client's payload data.

Figure 7:
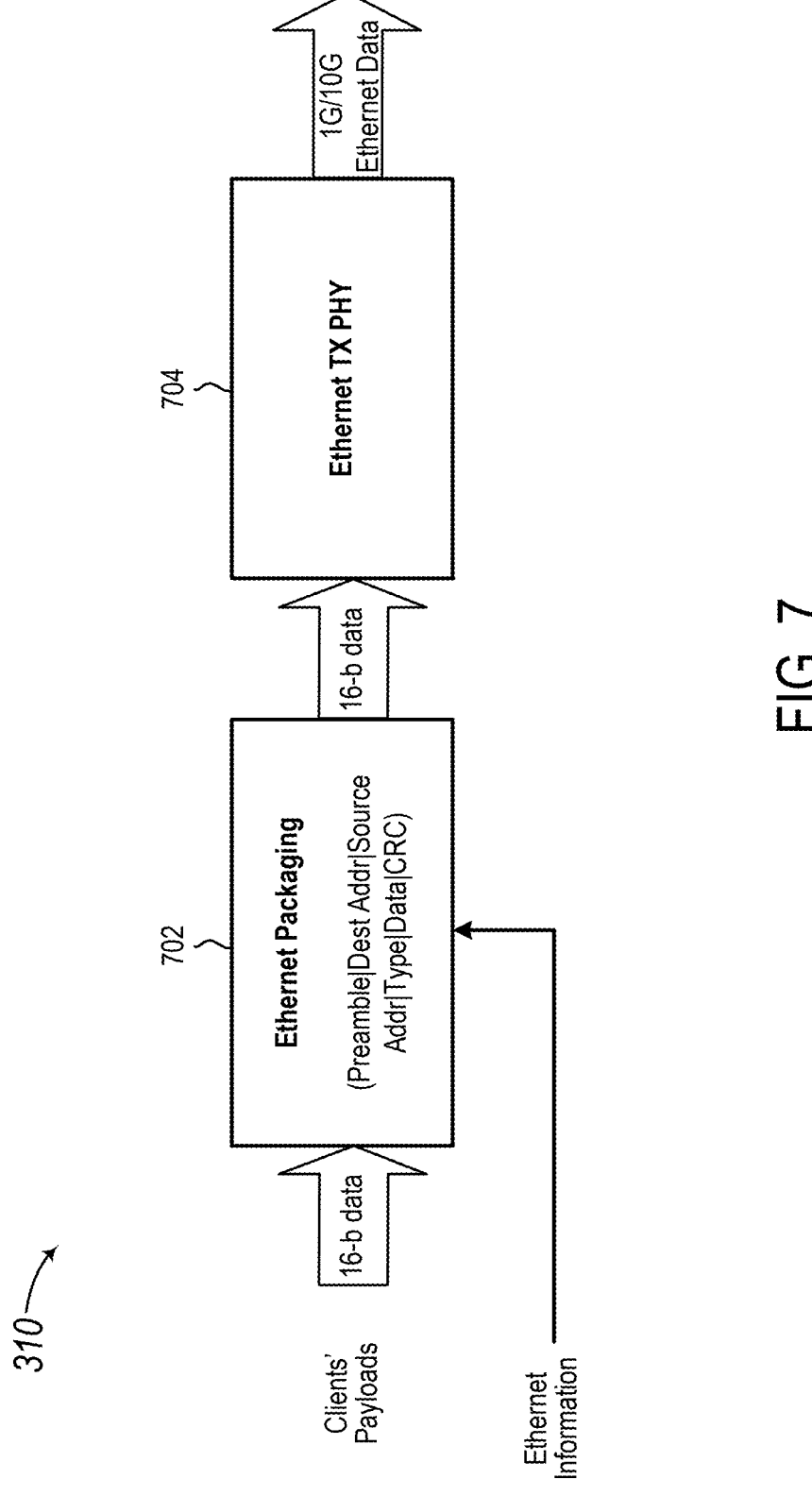
FIG. 7 is a functional block diagram illustrating an Ethernet packager & Transmit (Tx) physical layer (PHY) consistent with the present disclosure.

FIG. 7 is a functional block diagram illustrating the Ethernet packager & Tx physical layer (PHY) module 310 consistent with the present disclosure. The Ethernet packager & Tx PHY module 310 performs two functions on the client's payload data. First, the Ethernet packager module 702 packetizes the client's payload data into Ethernet packets by combining the client's payload data with the Ethernet information obtained from the control packages 334. In an embodiment, this may include, but is not limited to, adding a preamble, a destination address, a source address, an Ethernet type, the payload data, and a CRC calculation for the packet. The Ethernet packets are then transmitted by the Ethernet Tx PHY module 704. In an embodiment, the Ethernet packets may be transmitted over 1 G Ethernet, 10 G Ethernet, or any appropriate network speed or topology as would be known to a person of skill in the art.

Figure 8A:
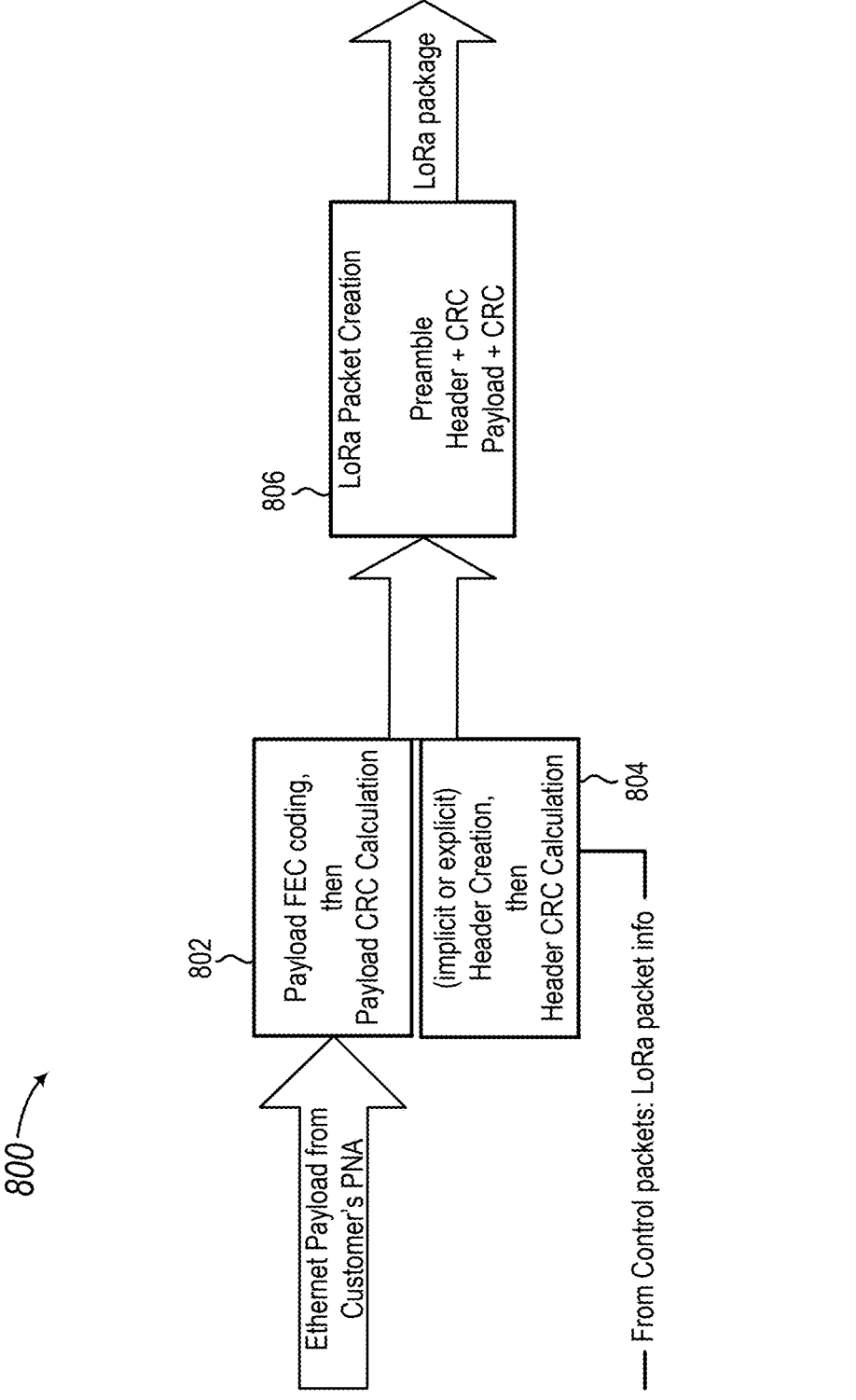
FIGS. 8A and 8B are functional block diagrams illustrating downstream FSK packaging consistent with the present disclosure.
Figure 8B:
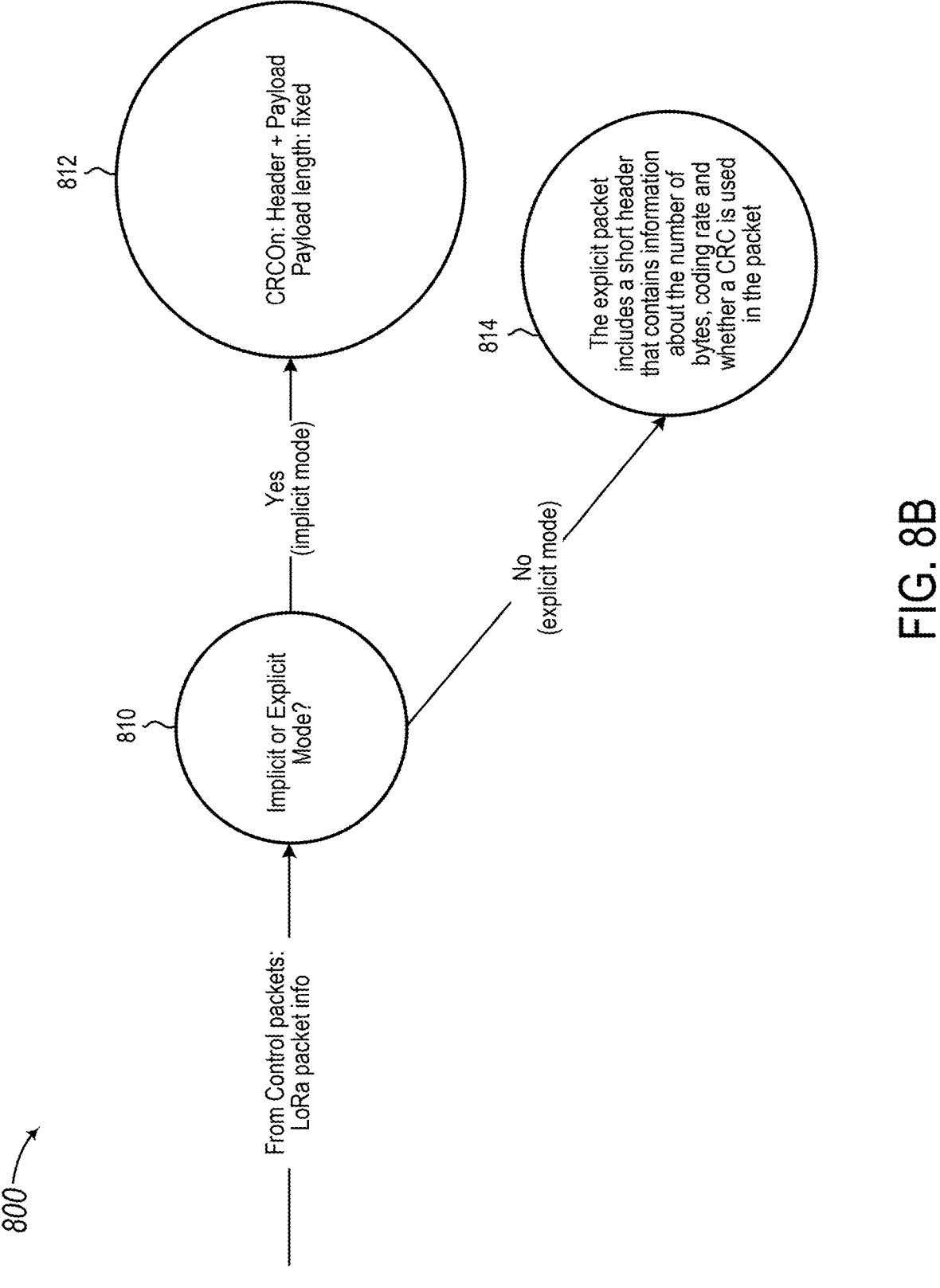

FIGS. 8A and 8B are functional block diagrams illustrating a downstream LoRa packaging module 800, which may include the Rx PHY module 320 and the forward LoRaWAN module 318. In the downstream direction, Rx PHY module 320 may receive Ethernet packets containing payload from the PNM 342 and sends the payload to the forward LoRaWAN module 318. Payload module 802 applies Forward Error Correction (FEC) to the payload, followed by performing a CRC calculation on the payload. Header module 804 receives LoRa packet information from the control packages 334 and creates a header. The header may be either implicit or explicit. Once the header has been created, the header module 804 performs a CRC calculation for the header. The header and the payload are then sent to the LoRa packet creation module 806, which creates a LoRa package from a preamble, the header and the header CRC, and the payload and the payload CRC.

FIG. 8B is an example of header creation in the forward LoRaWAN module 318. In the example of FIG. 8B, the LoRa packet information is retrieved from the control packages 334. The mode module 810 uses the LoRa packet information to determine whether the LoRa packet is in implicit mode or explicit mode. If the LoRa packet is in implicit mode, then implicit module 812 uses the CRC calculations from both the header and the payload and makes the payload length fixed. The table in FIG. 8C is an example of a lookup table for the CRC status in the implicit mode header.

If the LoRa packet is in explicit mode, then explicit module 814 creates the header. In explicit mode, the packet includes a short header that contains information about the number of bytes, coding rate and whether a CRC is used in the packet. The table in FIG. 8D is an example of a lookup table for the CRC status in the explicit mode header.

The forward LoRaWAN module 318 then sends the LoRa packet to the FSK packet mode transmitter module 316, which converts the LoRa packet into a bitstream.

Figure 9:
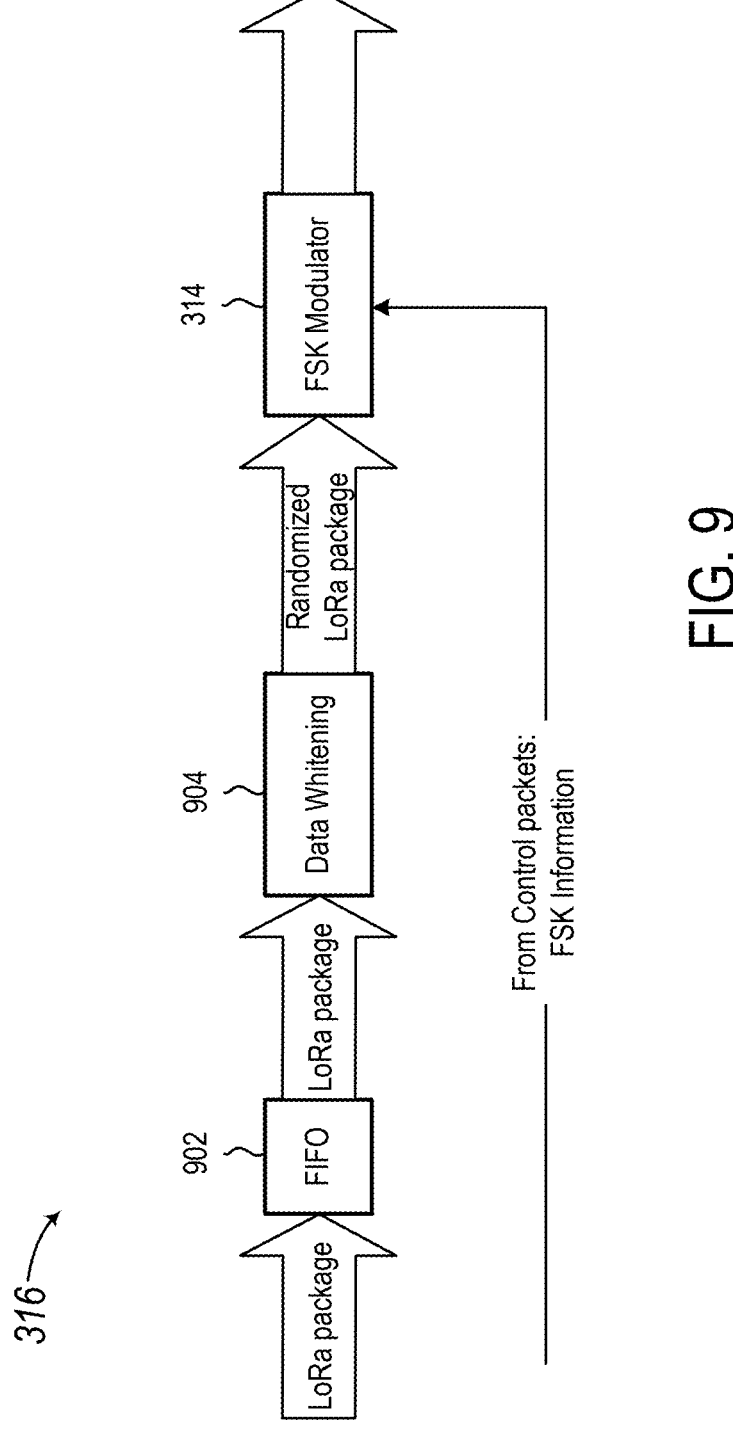
FIG. 9 is a functional block diagram illustrating a downstream FSK modulator consistent with the present disclosure.

FIG. 9 is a functional block diagram illustrating an example of the FSK packet mode transmitter module 316 consistent with the present disclosure. The FSK packet mode transmitter module 316 receives the LoRa packet from the forward LoRaWAN module 318 and inserts the bitstream into FIFO module 902. The FIFO module 902 forwards the LoRa package bitstream into data whitening module 904. As explained above for the data de-whitening module 602, the LoRa specification supports a data whitening block that breaks series of identical bits and introduces randomness in the stream. In an embodiment, the data whitening module 904 uses a linear-feedback shift register (LFSR), which is a shift register whose input bit is a linear function of its previous state. In one example embodiment, the LFSR polynomial may be X9+X5+1. The data whitening module 904 converts the LoRa package bitstream into a randomized LoRa package. The randomized LoRa package is then converted to a bitstream by the downstream FSK modulator module 314. In an embodiment, the bitstream may be in 10-bit I/Q format.

Figure 10:
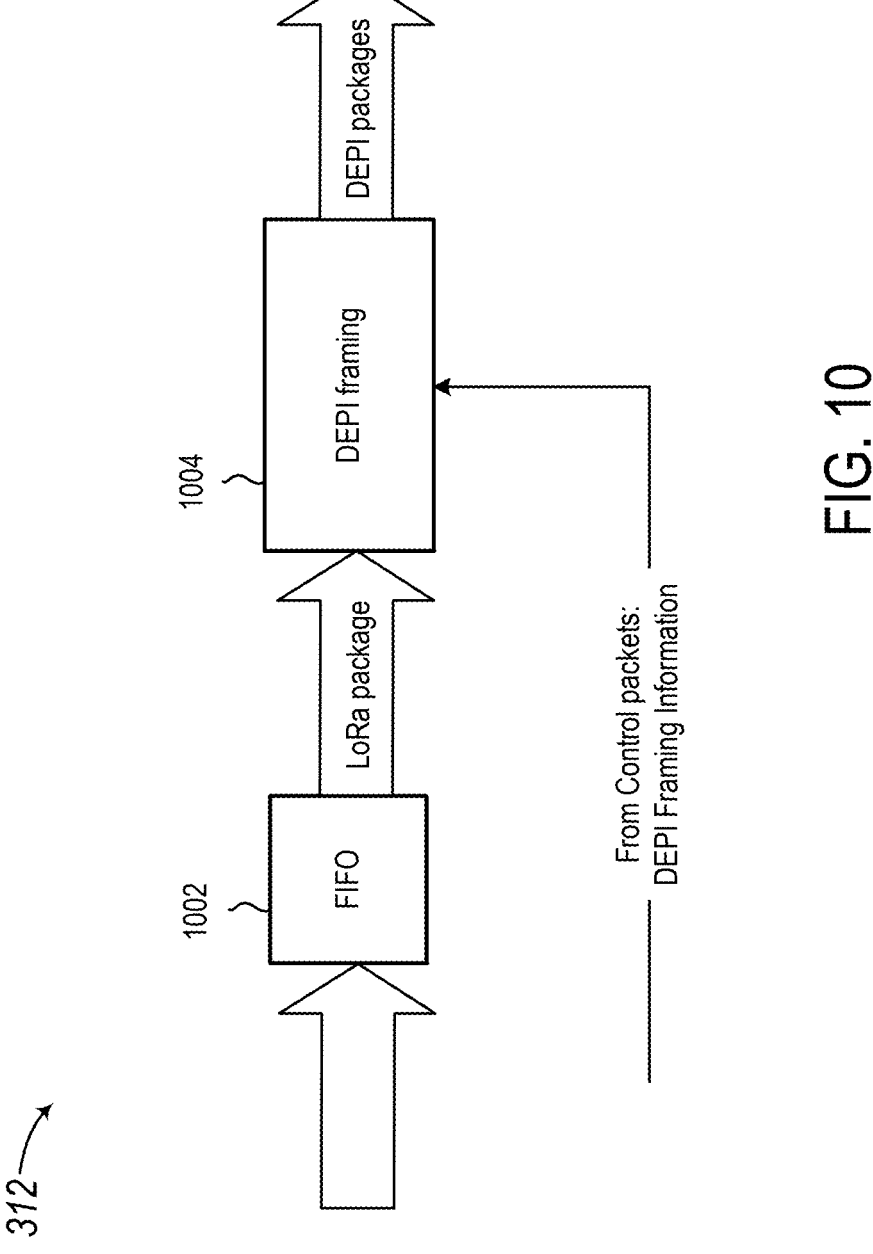
FIG. 10 is a functional block diagram illustrating the Downstream External PHY Interface (DEPI) framing consistent with the present disclosure.

FIG. 10 is a functional block diagram illustrating the NDF packetizer module 312. The NDF packetizer 312 receives the bitstream from the downstream FSK modulator module 314 in a FIFO module 1002 and passes the bitstream containing the LoRa package to the framing module 1004. The framing module 1004 receives framing information, e.g., DEPI framing information, from the control packages 334, and uses the framing information to convert the bitstream containing the LoRa package into Ethernet packets. The Ethernet packets are then transmitted to the NDF 336 of the RF amplifier.

Figure 11:
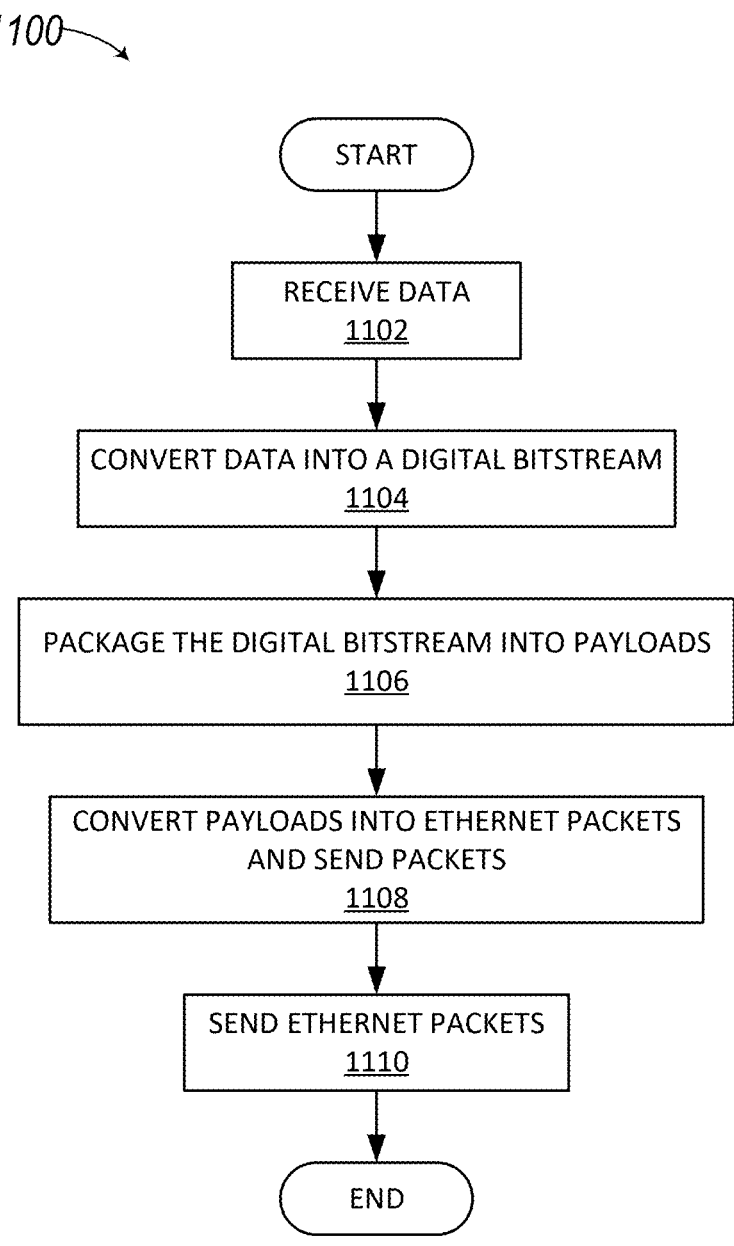
FIG. 11 is a flowchart diagram depicting operations for the return control for the virtual gateway on the distributed data processing environment of FIG. 13, consistent with the present disclosure.
Figure 13:
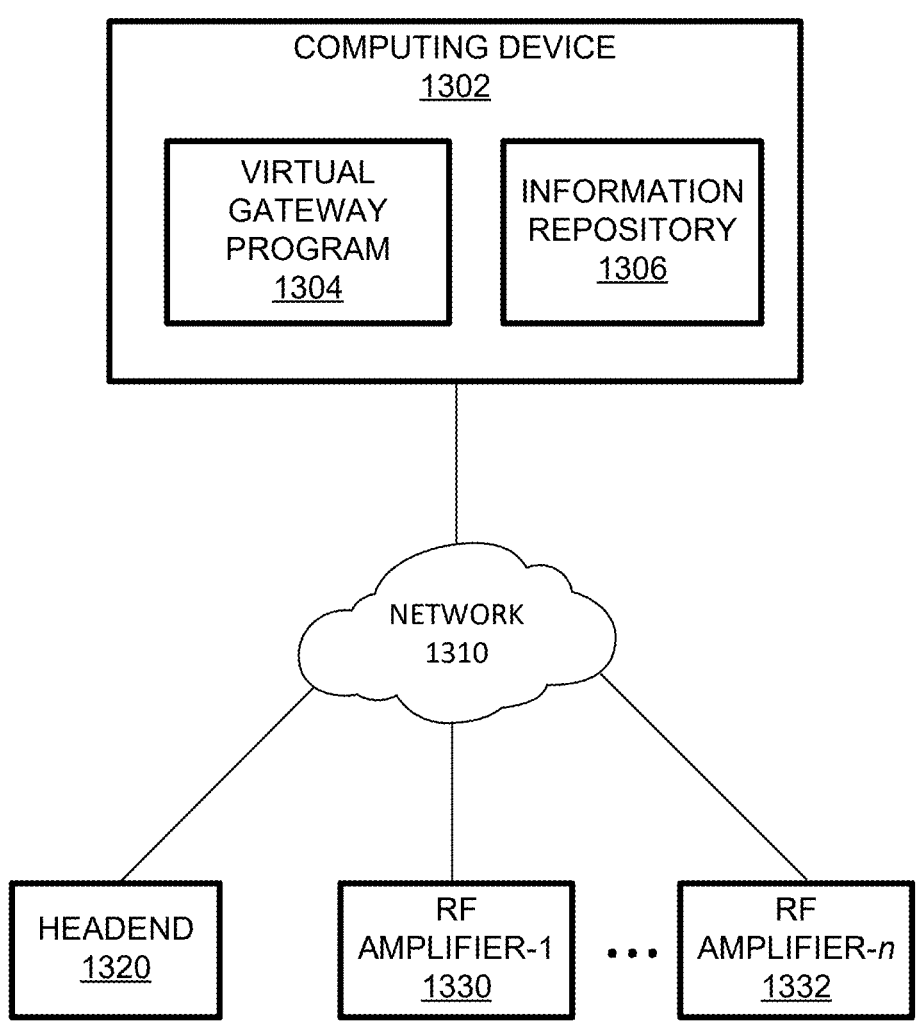
FIG. 13 is a functional block diagram illustrating a distributed data processing environment, generally designated 1300, suitable for operation of virtual gateway program 1304 in accordance with at least one embodiment of the present disclosure.

FIG. 11 is a flowchart diagram of workflow 1100 depicting operations for the return communications from the RF amplifiers to the headend for the virtual gateway on the distributed data processing environment of FIG. 13, consistent with the present disclosure. In an alternative embodiment, the operations of workflow 1100 may be performed by any other program while working with the virtual gateway 300.

It should be appreciated that embodiments of the present disclosure provide at least for operations for the return communications for the virtual gateway 300 on the distributed data processing environment of FIG. 13. However, FIG. 11 provides only an illustration of one implementation and does not imply any limitations with regard to the environments in which different embodiments may be implemented. Many modifications to the depicted environment may be made by those skilled in the art without departing from the scope of the disclosure as recited by the claims.

The virtual gateway 300 receives data (operation 1102). In the illustrated example embodiment, the virtual gateway 300 receives NDR data from the NDR 332 of the RF amplifiers as one or more NDR Ethernet packets.

The program converts the data into a digital bitstream (operation 1104). The program may use the frequency information obtained from the control packages 334 from the RF amplifiers to convert the serial data into a digital bitstream. In an embodiment, the digital bitstream may be 10-bit I/Q data.

The program packages the digital bitstream into payloads (operation 1106). The program packages the digital bitstream into payloads for OOB transmission.

The program converts the payloads into return Ethernet packets (operation 1112). The program packages the payloads for the OOB transmission into return Ethernet packets.

The program sends the Ethernet packets (operation 1110). The program sends the return Ethernet packets to the headend via the cloud 340.

Figure 12:
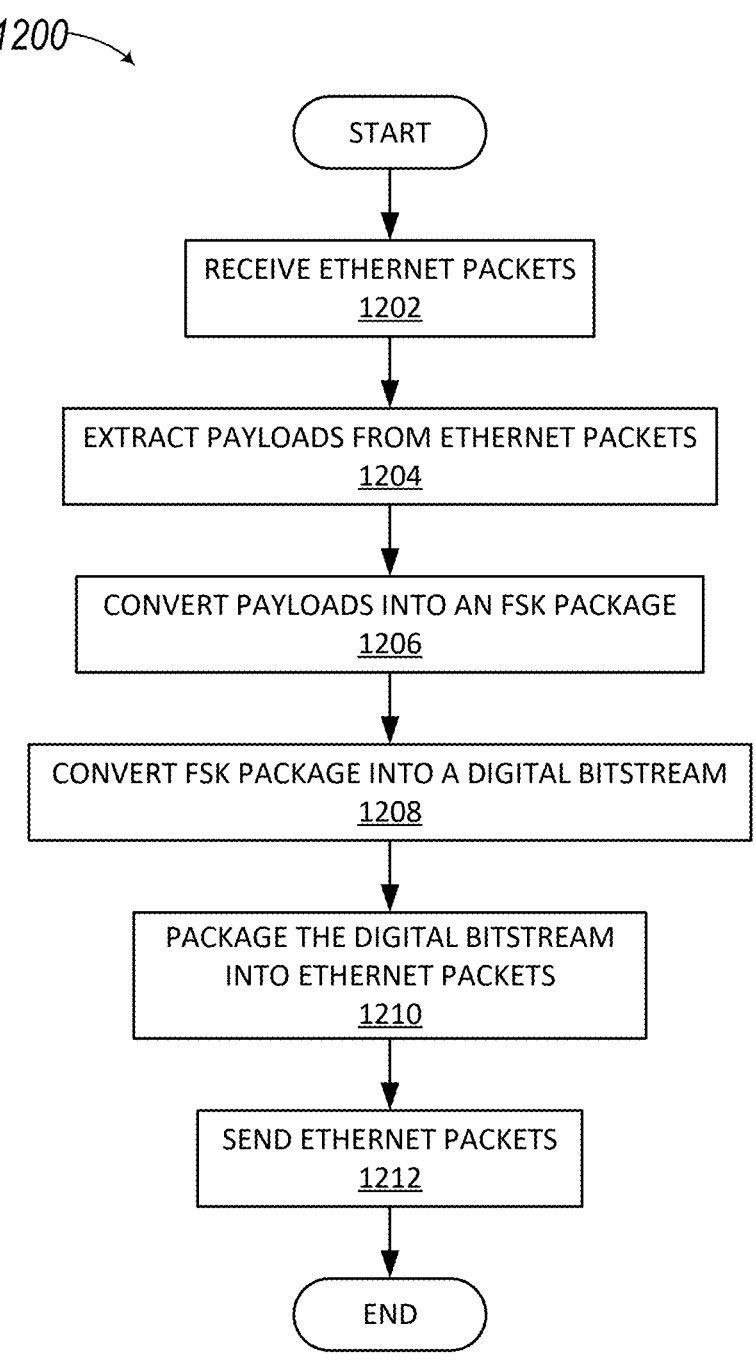
FIG. 12 is a flowchart diagram depicting operations for the forward control for the virtual gateway on the distributed data processing environment of FIG. 13, consistent with the present disclosure.

FIG. 12 is a flowchart diagram of workflow 1200 depicting operations for the forward communications from the headend to the RF amplifiers for the virtual gateway 300 on the distributed data processing environment of FIG. 13, consistent with the present disclosure. In an alternative embodiment, the operations of workflow 1100 may be performed by any other program while working with the virtual gateway 300.

It should be appreciated that embodiments of the present disclosure provide at least for operations for the forward communications for the virtual gateway 300 on the distributed data processing environment of FIG. 13. However, FIG. 12 provides only an illustration of one implementation and does not imply any limitations with regard to the environments in which different embodiments may be implemented. Many modifications to the depicted environment may be made by those skilled in the art without departing from the scope of the disclosure as recited by the claims.

The virtual gateway 300 receives forward Ethernet packets (operation 1202). In the illustrated example embodiment, the virtual gateway 300 receives data in Ethernet packets from the PNM 342 in the headend over the headend cloud 340.

The program extracts payloads from the forward Ethernet packets (operation 1204). The program unpackages the packets to obtain the customer PNM payload.

The program convert payloads into an FSK package (operation 1206). The program performs FSK packaging of the customer PNM payload.

The program converts the FSK package into a digital bitstream (operation 1208). The program converts the FSK package into a digital bitstream. In an embodiment, the program may use frequency information obtained from the control packages 334 to convert the FSK package into a digital bitstream.

The program packages the digital bitstream into NDF Ethernet packets (operation 1210). In an embodiment, the NDF Ethernet packets may contain DOCSIS External Downstream Interface (DEPI) packages.

The program sends the NDF Ethernet packets (operation 1214). The program sends the NDF Ethernet packets to the RF amplifier via the cloud 330.

FIG. 13 is a functional block diagram illustrating a distributed data processing environment, generally designated 1300, suitable for operation of virtual gateway program 1304 in accordance with at least one embodiment of the present disclosure. The term "distributed" as used herein describes a computer system that includes multiple, physically distinct devices that operate together as a single computer system. FIG. 13 provides only an illustration of one implementation and does not imply any limitations with regard to the environments in which different embodiments may be implemented. Many modifications to the depicted environment may be made by those skilled in the art without departing from the scope of the disclosure as recited by the claims.

Distributed data processing environment 1300 includes computing device 1302 optionally connected to network 1310. Network 1310 can be, for example, a CATV network, including an HFC network, a telecommunications network, a local area network (LAN), a wide area network (WAN), such as the Internet, or any combination thereof, and can include wired, wireless, or fiber optic connections. Network 1310 can include one or more wired and/or wireless networks that are capable of receiving and transmitting data, voice, and/or video signals, including multimedia signals that include voice, data, and video information. In general, network 1310 can be any combination of connections and protocols that will support communications between computing device 1302 and other computing devices (not shown) within distributed data processing environment 1300.

Computing device 1302 can be a standalone computing device, a management server, a web server, an embedded computing device, or any programmable electronic device capable of communicating with other computing devices (not shown) within distributed data processing environment 1300 via network 1310. In another embodiment, computing device 1302 can represent a server computing system utilizing multiple computers as a server system, such as in a cloud computing environment. In yet another embodiment, computing device 1302 represents a computing system utilizing clustered computers and components (e.g., database server computers, application server computers) that act as a single pool of seamless resources when accessed within distributed data processing environment 1300.

In an embodiment, computing device 1302 includes virtual gateway program 1304. In an embodiment, virtual gateway program 1304 is a program, application, or subprogram of a larger program to implement a virtual gateway in software. In an alternative embodiment, virtual gateway program 1304 may be located on any other device accessible by computing device 1302 via network 1310.

In an embodiment, computing device 1302 includes information repository 1306. In an embodiment, information repository 1306 may be managed by virtual gateway program 1304. In an alternate embodiment, information repository 1306 may be managed by the operating system of the computing device 1302, alone, or together with, virtual gateway program 1304. Information repository 1306 is a data repository that can store, gather, compare, and/or combine information. In some embodiments, information repository 1306 is located externally to computing device 1302 and accessed through a communication network, such as network 1310. In some embodiments, information repository 1306 is stored on computing device 1302. In some embodiments, information repository 1306 may reside on another computing device (not shown), provided that information repository 1306 is accessible by computing device 1302.

Information repository 1306 may be implemented using any volatile or non-volatile non-transitory computer readable storage media for storing information, as known in the art. For example, information repository 1306 may be implemented with random-access memory (RAM), solid-state drives (SSD), one or more independent hard disk drives, multiple hard disk drives in a redundant array of independent disks (RAID), or an optical library. Similarly, information repository 1306 may be implemented with any suitable storage architecture known in the art, such as a relational database, an object-oriented database, or one or more tables.

Distributed data processing environment 1300 may include headend 1320. Headend 1320 may be, for example, headend 210 from FIG. 2. Distributed data processing environment 1300 may also include one or more RF amplifiers, which may include RF amplifier-1 1330 through RF amplifier-n 1332. RF amplifier-1 1330 through RF amplifier-n 1332 may be, for example, RF amplifiers 219a-c from FIG. 2.

Figure 14:
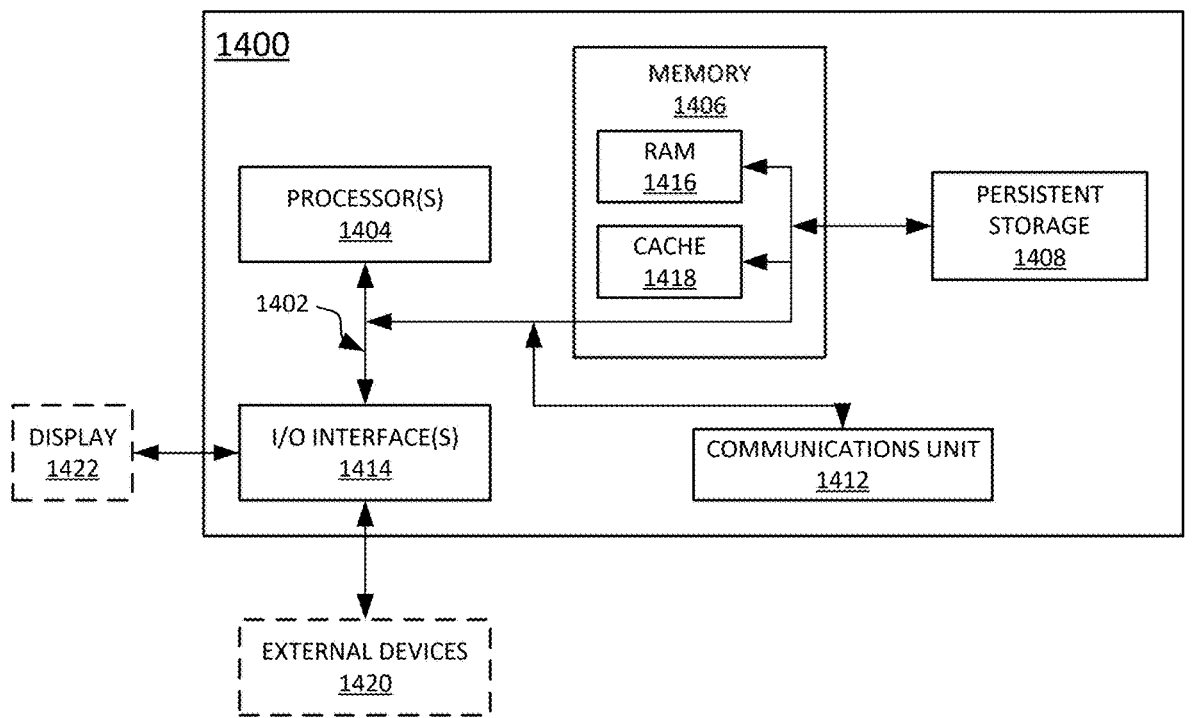
FIG. 14 depicts a block diagram of components of the computing device executing code for the software headend virtual gateway within the distributed data processing environment of FIG. 13, in accordance with an embodiment of the present disclosure.

FIG. 14 is a block diagram depicting components of one example of the computing device 1400 suitable for a software headend virtual gateway, within the distributed data processing environment of FIG. 13, consistent with the present disclosure. FIG. 14 displays the computing device or computer 1400, one or more processor(s) 1404 (including one or more computer processors), a communications fabric 1402, a memory 1406 including, a random-access memory (RAM) 1416 and a cache 1418, a persistent storage 1408, a communications unit 1412, I/O interfaces 1414, a display 1422, and external devices 1420. It should be appreciated that FIG. 14 provides only an illustration of one embodiment and does not imply any limitations with regard to the environments in which different embodiments may be implemented. Many modifications to the depicted environment may be made.

As depicted, the computer 1400 operates over the communications fabric 1402, which provides communications between the computer processor(s) 1404, memory 1406, persistent storage 1408, communications unit 1412, and input/output (I/O) interface(s) 1414. The communications fabric 1402 may be implemented with an architecture suitable for passing data or control information between the processors 1404 (e.g., microprocessors, communications processors, and network processors), the memory 1406, the external devices 1420, and any other hardware components within a system. For example, the communications fabric 1402 may be implemented with one or more buses.

The memory 1406 and persistent storage 1408 are computer readable storage media. In the depicted embodiment, the memory 1406 comprises a RAM 1416 and a cache 1418.

In general, the memory 1406 can include any suitable volatile or non-volatile computer readable storage media. Cache 1418 is a fast memory that enhances the performance of processor(s) 1404 by holding recently accessed data, and near recently accessed data, from RAM 1416.

Program instructions for the software headend virtual gateway may be stored in the persistent storage 1408, or more generally, any computer readable storage media, for execution by one or more of the respective computer processors 1404 via one or more memories of the memory 1406. The persistent storage 1408 may be a magnetic hard disk drive, a solid-state disk drive, a semiconductor storage device, flash memory, read only memory (ROM), electronically erasable programmable read-only memory (EEPROM), or any other computer readable storage media that is capable of storing program instruction or digital information.

The media used by persistent storage 1408 may also be removable. For example, a removable hard drive may be used for persistent storage 1408. Other examples include optical and magnetic disks, thumb drives, and smart cards that are inserted into a drive for transfer onto another computer readable storage medium that is also part of persistent storage 1408.

The communications unit 1412, in these examples, provides for communications with other data processing systems or devices. In these examples, the communications unit 1412 includes one or more network interface cards. The communications unit 1412 may provide communications through the use of either or both physical and wireless communications links. In the context of some embodiments of the present disclosure, the source of the various input data may be physically remote to the computer 1400 such that the input data may be received, and the output similarly transmitted via the communications unit 1412.

The I/O interface(s) 1414 allows for input and output of data with other devices that may be connected to computer 1400. For example, the I/O interface(s) 1414 may provide a connection to external device(s) 1420 such as a keyboard, a keypad, a touch screen, a microphone, a digital camera, and/or some other suitable input device. External device(s) 1420 can also include portable computer readable storage media such as, for example, thumb drives, portable optical or magnetic disks, and memory cards. Software and data used to practice embodiments of the present disclosure, e.g., the software headend virtual gateway, can be stored on such portable computer readable storage media and can be loaded onto persistent storage 1408 via the I/O interface(s) 1414. I/O interface(s) 1414 also connect to a display 1422.

Display 1422 provides a mechanism to display data to a user and may be, for example, a computer monitor. Display 1422 can also function as a touchscreen, such as a display of a tablet computer.

According to one aspect of the disclosure there is thus provided a computer-implemented method for communication with radio frequency (RF) amplifiers in a hybrid fiber-coaxial (HFC) network, the computer-implemented method including: providing, by one or more computer processors, return communications from one or more RF amplifiers to a headend; and providing, by the one or more computer processors, forward communications from the headend to the one or more RF amplifiers, wherein: the return communications and the forward communications use out of band (OOB) communication protocols.

According to another aspect of the disclosure, there is provided a system for communication with radio frequency (RF) amplifiers in a hybrid fiber-coaxial (HFC) network, the system including: a headend; one or more RF amplifiers; one or more computer processors; one or more non-transitory computer readable storage media; and program instructions stored on the one or more non-transitory computer readable storage media for execution by at least one of the one or more computer processors, the program instructions including instructions to: provide return communications from the one or more RF amplifiers to the headend; and provide forward communications from the headend to the one or more RF amplifiers, wherein: the return communications and the forward communications use out of band (OOB) communication protocols.

According to yet another aspect of the disclosure, there is provided a system for communication with radio frequency (RF) amplifiers in a hybrid fiber-coaxial (HFC) network, the system including: a headend; one or more RF amplifiers; one or more computer processors; one or more non-transitory computer readable storage media; and program instructions stored on the one or more non-transitory computer readable storage media for execution by at least one of the one or more computer processors, the program instructions including instructions to: provide out of band (OOB) return communications from the one or more RF amplifiers to the headend, including instructions to: receive data to be sent from the one or more RF amplifiers to the headend; convert the data into a return digital bitstream; package the return digital bitstream into one or more return payloads for OOB transmission; convert the one or more return payloads into one or more return Ethernet packets; send the one or more return Ethernet packets to the headend; provide OOB forward communications from the headend to the one or more RF amplifiers, including instructions to: receive one or more forward Ethernet packets from the headend; extract one or more forward payloads from the forward Ethernet packets; convert the one or more forward payloads into a Frequency-shift keying (FSK) package; convert the FSK package into a forward digital bitstream; package the forward digital bitstream into the one or more return Ethernet packets; and send the one or more return Ethernet packets to the one or more RF amplifiers.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto.

Embodiments of the methods described herein may be implemented using a controller, processor, and/or other programmable device. To that end, the methods described herein may be implemented on a tangible, non-transitory computer readable medium having instructions stored thereon that when executed by one or more processors perform the methods. Thus, for example, the persistent storage 1408 may store instructions (in, for example, firmware or software) to perform the operations described herein. The storage medium, e.g. the persistent storage 1408, may include any type of tangible medium, for example, any type of disk optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

It will be appreciated by those skilled in the art that any block diagrams herein represent conceptual views of illustrative circuitry embodying the principles of the disclosure. Similarly, it will be appreciated that any block diagrams, flow charts, flow diagrams, state transition diagrams, pseudocode, and the like represent various processes which may be substantially represented in computer readable medium and so executed by a computer or processor, whether or not such computer or processor is explicitly shown. Software modules, or simply modules which are implied to be software, may be represented herein as any combination of flowchart elements or other elements indicating performance of process steps and/or textual description. Such modules may be executed by hardware that is expressly or implicitly shown.

The functions of the various elements shown in the figures, including any functional blocks labeled as a controller or processor, may be provided through the use of dedicated hardware as well as hardware capable of executing software in association with appropriate software. The functions may be provided by a single dedicated processor, by a single shared processor, or by a plurality of individual processors, some of which may be shared. Moreover, explicit use of the term controller or processor should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

The term "coupled" as used herein refers to any connection, coupling, link, or the like by which signals carried by one system element are imparted to the "coupled" element. Such "coupled" devices, or signals and devices, are not necessarily directly connected to one another and may be separated by intermediate components or devices that may manipulate or modify such signals.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems. Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Although the methods and systems have been described relative to a specific embodiment thereof, they are not so limited. Obviously, many modifications and variations may become apparent in light of the above teachings. Many additional changes in the details, materials, and arrangement of parts, herein described and illustrated, may be made by those skilled in the art.

What is claimed is:

1. A computer-implemented method for communication with radio frequency (RF) amplifiers in a hybrid fiber-coaxial (HFC) network, the computer-implemented method comprising:

providing, by one or more computer processors, return communications from one or more RF amplifiers to a headend; and providing, by the one or more computer processors, forward communications from the headend to the one or more RF amplifiers, wherein:

the return communications and the forward communications use out of band (OOB) communication protocols.

2. The computer-implemented method of claim 1, wherein providing the return communications from the one or more RF amplifiers to the headend further comprises:

receiving, by the one or more computer processors, one or more NDR Ethernet packets containing data to be sent from the one or more RF amplifiers to the headend;

converting, by the one or more computer processors, the data into a return digital bitstream;

packaging, by the one or more computer processors, the return digital bitstream into one or more payloads for out of band (OOB) transmission;

converting, by the one or more computer processors, the one or more payloads into one or more return Ethernet packets; and sending, by the one or more computer processors, the one or more return Ethernet packets to the headend.

3. The computer-implemented method of claim 2, wherein the return digital bitstream is in I/Q (in-phase (I) and quadrature (Q) components) format.

4. The computer-implemented method of claim 2, wherein converting the data into the return digital bitstream further comprises:

demodulating the data into the return digital bitstream using frequency information obtained from one or more control packages received from the one or more RF amplifiers.

5. The computer-implemented method of claim 2, wherein converting the data into the return digital bitstream further comprises:

de-whitening, by the one or more computer processors, the data;

retrieving, by the one or more computer processors, a first number of preambles and a second number of sync words from one or more control packages received from the one or more RF amplifiers;

retrieving, by the one or more computer processors, a header, the one or more payloads, and one or more CRC calculations; and combining, by the one or more computer processors, the first number of preambles, the second number of sync words, the header, the one or more payloads, and the one or more CRC calculations into the return digital bitstream.

6. The computer-implemented method of claim 2, wherein converting the one or more payloads into the return Ethernet packets further comprises:

combining the return digital bitstream with Ethernet information obtained from one or more control packages received from the one or more RF amplifiers, wherein the Ethernet information includes at least one of a preamble, a destination address, a source address, an Ethernet type, the one or more payloads, and a CRC calculation for the return Ethernet packets.

7. The computer-implemented method of claim 1, wherein providing the forward communications from the headend to the one or more RF amplifiers further comprises:

receiving, by the one or more computer processors, one or more forward Ethernet packets from the headend;

extracting, by the one or more computer processors, one or more payloads from the one or more forward Ethernet packets;

converting, by the one or more computer processors, the one or more payloads into a Frequency-shift keying (FSK) package;

converting, by the one or more computer processors, the FSK package into a forward digital bitstream;

packaging, by the one or more computer processors, the forward digital bitstream into one or more NDF Ethernet packets; and sending, by the one or more computer processors, the one or more NDF Ethernet packets to the one or more RF amplifiers.

8. The computer-implemented method of claim 7, wherein converting the FSK package into the forward digital bitstream further comprises:

using frequency information obtained from one or more control packages received from the one or more RF amplifiers.

9. The computer-implemented method of claim 7, wherein the forward digital bitstream is in I/Q (in-phase (I) and quadrature (Q) components) format.

10. The computer-implemented method of claim 7, wherein the one or more NDF Ethernet packets contain DOCSIS External Downstream Interface (DEPI) packages.

11. A system for communication with radio frequency (RF) amplifiers in a hybrid fiber-coaxial (HFC) network, the system comprising:

a headend;

one or more RF amplifiers;

one or more computer processors;

one or more non-transitory computer readable storage media; and program instructions stored on the one or more non-transitory computer readable storage media for execution by at least one of the one or more computer processors, the program instructions including instructions to:

provide return communications from the one or more RF amplifiers to the headend; and provide forward communications from the headend to the one or more RF amplifiers, wherein:

the return communications and the forward communications use out of band (OOB) communication protocols.

12. The system of claim 11, wherein providing the return communications from the one or more RF amplifiers to the headend further comprises:

receive one or more NDR Ethernet packets containing data to be sent from the one or more RF amplifiers to the headend;

convert the data into a return digital bitstream;

package the return digital bitstream into one or more payloads for out of band (OOB) transmission;

convert the one or more payloads into one or more return Ethernet packets; and send the one or more return Ethernet packets to the headend.

13. The system of claim 12, wherein convert the data into the return digital bitstream further comprises:

de-whiten the data;

retrieve a first number of preambles and a second number of sync words from one or more control packages received from the one or more RF amplifiers;

retrieve a header, the one or more payloads, and one or more CRC calculations; and combine the first number of preambles, the second number of sync words, the header, the one or more payloads, and the one or more CRC calculations into the return digital bitstream.

14. The system of claim 12, wherein convert the data into the return digital bitstream further comprises:

demodulate the data into the return digital bitstream using frequency information obtained from one or more control packages received from the one or more RF amplifiers.

15. The system of claim 12, wherein convert the one or more payloads into the return Ethernet packets further comprises:

combine the return digital bitstream with Ethernet information obtained from one or more control packages received from the one or more RF amplifiers, wherein the Ethernet information includes at least one of a preamble, a destination address, a source address, an Ethernet type, the one or more payloads, and a CRC calculation for the return Ethernet packets.

16. The system of claim 11, wherein providing the forward communications from the headend to the one or more RF amplifiers further comprises:

receive one or more forward Ethernet packets from the headend;

extract one or more payloads from the one or more forward Ethernet packets;

convert the one or more payloads into a Frequency-shift keying (FSK) package;

convert the FSK package into a forward digital bitstream;

package the forward digital bitstream into one or more NDF Ethernet packets; and send the one or more NDF Ethernet packets to the one or more RF amplifiers.

17. A system for communication with radio frequency (RF) amplifiers in a hybrid fiber-coaxial (HFC) network, the system comprising:

a headend;

one or more RF amplifiers;

one or more computer processors;

one or more non-transitory computer readable storage media; and program instructions stored on the one or more non-transitory computer readable storage media for execution by at least one of the one or more computer processors, the program instructions including instructions to:

provide out of band (OOB) return communications from the one or more RF amplifiers to the headend, including instructions to:

receive one or more NDR Ethernet packets containing data to be sent from the one or more RF amplifiers to the headend;

convert the data into a return digital bitstream;

package the return digital bitstream into one or more return payloads for OOB transmission;

convert the one or more return payloads into one or more return Ethernet packets;

send the one or more return Ethernet packets to the headend;

provide OOB forward communications from the headend to the one or more RF amplifiers, including instructions to:

receive one or more forward Ethernet packets from the headend;

extract one or more forward payloads from the forward Ethernet packets;

convert the one or more forward payloads into a Frequency-shift keying (FSK) package;

convert the FSK package into a forward digital bitstream;

package the forward digital bitstream into one or more NDF Ethernet packets; and send the one or more NDF Ethernet packets to the one or more RF amplifiers.

18. The system of claim 17, wherein convert the data into the return digital bitstream further comprises:

de-whiten the data;

retrieve a first number of preambles and a second number of sync words from one or more control packages received from the one or more RF amplifiers;

retrieve a header, the one or more return payloads, and one or more CRC calculations; and combine the first number of preambles, the second number of sync words, the header, the one or more return payloads, and the one or more CRC calculations into the return digital bitstream.

19. The system of claim 17, wherein convert the data into the return digital bitstream further comprises:

demodulate the data into the return digital bitstream using frequency information obtained from one or more control packages received from the one or more RF amplifiers.

20. The system of claim 17, wherein convert the one or more return payloads into the return Ethernet packets further comprises:

combine the forward digital bitstream with Ethernet information obtained from one or more control packages received from the one or more RF amplifiers, wherein the Ethernet information includes at least one of a preamble, a destination address, a source address, an Ethernet type, the one or more return payloads, and a CRC calculation for the return Ethernet packets.

* * * * *